UNITED STATES PATENT OFFICE 1,951,830

CHROMIUM COMPOUND OF AZO DYESTUFFS

Hans Krzikalla, Mannheim, Germany, assignor to General Aniline Works, Inc., New York, N. Y., a corporation of Delaware No Drawing. Application July 22, 1930, Serial No. 469,927. In Germany July 27, 1929

3 Claims. (Cl. 260—12)

The present invention relates to complex chromium compounds of azo dyestuffs.

I have found that valuable complex chromium compounds of azo dyestuffs are obtained by causing chromium compounds to act on azo dyestuffs which have been obtained by coupling diazotized aromatic amines free from hydroxyl and carboxyl groups in the ortho position to the amino group with 1-phenyl-3-methyl-5-pyrazolones which contain a hydroxyl group and a carboxyl group in the ortho position to one another in the phenyl radicle and which if desired may contain other substituents. The azo dyestuffs of which the complex chromium compounds are produced according to my invention, contain only a single grouping of substituents, viz. the hydroxyl and carboxyl group in ortho position to each other in the phenyl group attached to the pyrazolone radicle, capable of binding a metal in complex combination and correspond to the general formula:

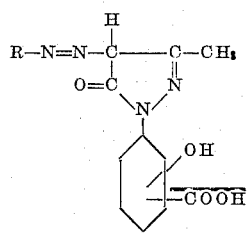

in which R stands for an aryl radicle which may be substituted, but is free from hydroxyl and carboxyl groups in the ortho position to the amino group.

The chroming of the dyestuffs may be carried out according to the usual methods by heating the dyestuff concerned with chromium salts under a reflux condenser or at increased pressure.

The complex chromium compounds of the said azo dyestuffs thus obtained dye wool fast, usually pure yellow to orange, shades, having an excellent fastness to light and may be employed for other purposes as for example for printing on cotton or for the preparation of lakes and the like. Particularly good dyestuffs are obtained by chroming azo dyestuffs of the aforedescribed kind containing as diazo components those derived from aniline sulphonic acids containing no further substituents, especially from metanilic acid.

By the term "complex preliminary chromation product of an azo dyestuff" when employed in the present application there is understood a complex chromium compound of an azo dyestuff obtained by acting on the azo dyestuff as such with chroming agents before bringing it into contact with the fibre.

The following examples will further illustrate the nature of this invention but the invention is not restricted to these examples. The parts are by weight.

Example 1

About 38 parts of the azo dyestuff obtained from diazotized metaaminobenzoic acid and (2'-hydroxy-3'-carboxy-5' sulpho)-1-phenyl-3-methyl-5-pyrazolone are boiled under a reflux condenser for 3 hours in aqueous solution with 33 parts of a chromium hydrate paste containing 26 per cent of $Cr_2O_3$ and 17 parts of 85 per cent formic acid. After cooling and salting out with common salt a yellow dyestuff is obtained which dyes wool very evenly greenish yellow shades. The fastness of the resulting dyeings to washing and fulling is extremely good.

The chromium compounds of the azo dyestuffs from diazotized aniline or meta-chloroaniline and the same coupling component in a corresponding manner have similar tinctorial properties.

Example 2

42 parts of the azo dyestuff obtained from diazotized sulphanilic acid and (2'-hydroxy-3'-carboxy-5'-sulpho)-1-phenyl-3-methyl-5-pyrazolone are heated to 110° centigrade for 1 hour in an autoclave with the same amount of chromium hydrate paste and formic acid as that specified in Example 1 and about 600 parts of water. After salting out a chromium dyestuff is obtained which dyes leather yellow shades excellently fast to light.

The chromium compound of the azo dyestuff from diazotized sulphanilic acid and (2'-hydroxy-3'-carboxy)-1-phenyl-3-methyl-5-pyrazolone (obtainable by condensation of aceto acetic ester and the hydrazine from 1-amino-2-hydroxybenzene-3-carboxylic acid) prepared in an analogous manner behaves similarly to the last mentioned chromium dyestuff.

The chroming may also be carried out in the usual manner with a salt of hexavalent chromium as for example with sodium chromate.

Example 3

47 parts of the azo dyestuff obtained from diazotized naphthionic acid and (2'-hydroxy-3'-carboxy-1-phenyl-3-methyl-5-pyrazolone are warmed on the water bath for about 4 hours with an aqueous solution which contains about 24 parts of chromium acetate. A dyestuff is obtained which dyes wool and leather fast yellow orange shades. The chroming may also be carried out for example with the corresponding amount of chromium fluoride.

Example 4

39 parts of the azo dyestuff obtained from diazotized 2-chlor-4-toluidine and (2'-hydroxy-3'-carboxy-5'-sulpho)-1-phenyl-3-methyl-5-pyrazolone are chromed in the manner described in Example 1. The solution of the complex chromium compound formed is evaporated or the dyestuff salted out. It dyes wool yellow shades fast to light and washing.

Example 5

42 parts of the dyestuff obtained from diazotized metanilic acid and (2'-hydroxy-3'-carboxy-5'-sulpho)-1-phenyl-3-methyl-5-pyrazolone are chromed as described in Example 1. By evaporating to dryness the solution of the complex chromium compound formed, a dyestuff is obtained dyeing wool greenish yellow shades particularly fast against light.

A dyestuff having similar properties is obtained by chroming an azo dyestuff from diazotized o-aniline sulphonic acid and the pyrazolone derivative specified in the foregoing paragraph.

What I claim is:

1. Complex preliminary chromation products of azo dyestuffs corresponding to the general formula:

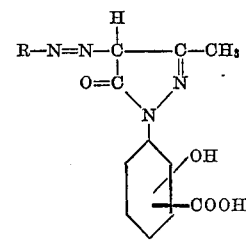

in which R stands for an aryl radicle free from hydroxyl and carboxyl groups in the ortho-position to the azo groups.

2. Complex preliminary chromation products of azo dyestuffs corresponding to the formula:

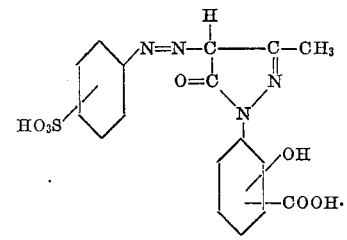

3. The complex chromium compound of the azo dyestuff corresponding to the formula:

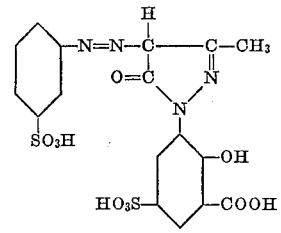

dyeing wool greenish yellow shade.

HANS KRZIKALLA.